(12) United States Patent
James

(10) Patent No.: US 10,650,176 B2
(45) Date of Patent: May 12, 2020

(54) DRIVELINE MODELLER

(71) Applicant: Romax Technology Limited, Nottingham (GB)

(72) Inventor: Barry James, Crewe (GB)

(73) Assignee: ROMAX TECHNOLOGY LIMITED, Nottingham (GB)

( * ) Notice: Subject to any disclaimer, the term of this patent is extended or adjusted under 35 U.S.C. 154(b) by 483 days.

(21) Appl. No.: 14/432,826

(22) PCT Filed: Sep. 30, 2013

(86) PCT No.: PCT/GB2013/052544
§ 371 (c)(1),
(2) Date: Apr. 1, 2015

(87) PCT Pub. No.: WO2014/053817
PCT Pub. Date: Apr. 10, 2014

(65) Prior Publication Data
US 2015/0347670 A1    Dec. 3, 2015

(30) Foreign Application Priority Data

Oct. 1, 2012   (EP) .................................... 12186876
Mar. 22, 2013  (GB) .................................. 1305324.4

(51) Int. Cl.
*G06F 30/23*   (2020.01)
*G06F 17/10*   (2006.01)
(Continued)

(52) U.S. Cl.
CPC .............. *G06F 30/23* (2020.01); *G06F 17/10* (2013.01); *G06F 30/15* (2020.01); *G06F 30/17* (2020.01)

(58) Field of Classification Search
CPC .. G06F 17/5018; G06F 17/10; G06F 17/5095; G06F 17/5086; G06F 30/23;
(Continued)

(56) References Cited

U.S. PATENT DOCUMENTS 5,297,057 A  *  3/1994  Kramer ............... G06F 17/5086
                                                         345/953
7,991,598 B1 *  8/2011  Wood ..................... G06F 30/20
                                                              703/7
(Continued)

FOREIGN PATENT DOCUMENTS

| EP | 1889192 | * 11/2010 | ............. G06F 17/50 |
| GB | 2470385 | * 5/2009 | ............. G06F 17/50 |
| WO | WO-2009/133161 | * 11/2009 | ............. G05B 23/02 |

OTHER PUBLICATIONS

Heber et al. "Supporting Finite Element Analysis with a Relational Database Backend Part III: OpenDX—Where the Numbers Come Alive." Technical Report MSR-TR-2005-151 [retrieved on Feb. 16, 2018]. Retrieved from <https://www.microsoft.com/en-us/research/wp-content/uploads/2005/11/tr-2005-151.pdf>.*
(Continued)

*Primary Examiner* — Rehana Perveen
*Assistant Examiner* — Alfred H B Wechselberger
(74) *Attorney, Agent, or Firm* — Perkins Coie LLP

(57) ABSTRACT

A method of computer aided engineering for designing a driveline comprises the steps of: creating a single parametric description of the driveline; analysing the parametric description for performance using one or more failure modes; and optimising performance by amending the parametric description and repeating the analysing step.

20 Claims, 5 Drawing Sheets

(51) Int. Cl.
  *G06F 30/15* (2020.01)
  *G06F 30/17* (2020.01)
(58) Field of Classification Search
  CPC .......... G06F 30/15; G06F 30/17; Y02T 10/56;
      B60W 10/02; F16H 2057/0087; F16H
      57/00
  See application file for complete search history.

(56) References Cited

U.S. PATENT DOCUMENTS

| | | | | |
|---|---|---|---|---|
| 2005/0022152 | A1* | 1/2005 | Turk | G06F 30/23 717/100 |
| 2006/0069962 | A1* | 3/2006 | Dittmann | G06F 30/23 714/40 |
| 2006/0259283 | A1* | 11/2006 | Brughmans | G06F 30/23 703/2 |
| 2012/0110595 | A1* | 5/2012 | Reitman | G06F 17/50 719/313 |

OTHER PUBLICATIONS

Zhou, Y. "Modeling and Simulation of Hybrid Electric Vehicles" [thesis], Chapter 3 and 5, Master of Applied Science, Department of Mechanical Engineering, University of Victoria [retrieved on Feb. 12, 2019]. Retrieved from <http://dspace.library.uvic.ca/handle/1828/307> (Year: 2007).*

Wilkins et al. "An Object-Oriented Modelling Tool of Hybrid Powertrains for Vehicle Performance Simulation" [retrieved on Feb. 12, 2019]. Retrieved from <https://www.semanticscholar.org/paper/An-Object-Oriented-Modelling-Tool-of-Hybrid-for-Wilkins-Lamp%C3%A9rth/491bc54418108e23f55269b26b16a76a85b1779b> (Year: 2002).*

Calderon et al. "Electromechanical Drivetrain Simulation" Proceedings of 9th PhD Seminar on Wind Energy in Europe, Gotland, Sweden [retrieved on Feb. 12, 2019]. Retrieved from <http://orbit.dtu.dk/en/publications/id(b6ca3061-1d50-4b5d-b908-98c9b568ade4).html> (Year: 2013).*

Barahona et al. "Coupling of HAWC2 and Matlab: Towards an Integrated Simulation Platform" EWEC [retrieved on Feb. 12, 2019].  Retrieved from <http://orbit.dtu.dk/en/publications/coupling-of-hawc2-and-matlab-towards-an-integrated-simulation-platform(a83735dd-3a7e-4424-adf7-bcbb4878c89b).html> (Year: 2010).*

Daneshi-Far et al. "Planetary Gearbox Effects on Induction Machine in Wind Turbine: Modeling and Analysis" XXth International Conference on Electrical Machines [retrieved on Feb. 12, 2019]. Retrieved from <https://ieeexplore.ieee.org/document/6350124/> (Year: 2012).*

Hwang et al. "Contact stress analysis for a pair of mating gears" Mathematical and Computer Modeling, vol. 57, pp. 40-49 [retrieved on Feb. 12, 2019]. Retrieved from <https://www.sciencedirect.com/science/article/pii/S0895717711003967> (Year: 2013).*

Wellmann et al. "Driveline boom interior noise prediction based on multi . . . " SAE 2011 Noise and Vibration Conf and Exhibit [retrieve on Aug. 29, 2019]. <https://www.fev.com/fileadmin/user_upload/Media/TechnicalPublications/NVH/Driveline_boom_interior_noise_prediction_based_on_multi_body_simulation.pdf>(Year: 2011).*

Hohn et al. "Design and optimization of automotive transmissions with the FVA-Workbench" Getriebe in Fahrzeugen 2011, vol. VDI-Berichte 2130, pp. 171-184 [retrieve on Feb. 24, 2020]. Retrieve from <https://www.zg-gmbh.de/download/Wirth_Workbench_180411_v2.pdf> (Year: 2011).*

Gerling et al. "Electric Machine Design Tailored for Powertrain Optimiz." 25th World Battery, Hybrid and Fuel Cell Elec. Vehicle Symp. [retrieved on Feb. 23, 2020]. Retrieved from <https://dokumente.unibw.de/pub/bscw.cgi/S50d01566/d6071771/2010%20EVS-25%20(Gerling%20-%20Dajaku%20-%20M%C3%BChlbauer).pdf> (Year: 2010).*

"RomaxDesigner: Single Product Model for . . . " Romax Tech. [retrieved May 22, 2017]. Retrieved <https://www.google.com/url?sa=t&rct=j&q=&esrc=s&source=web&cd=3&ved=0ahUKEwie162kzovUAhWD4iYKHW0zCIMQFgguMAI&url=http%3A%2F%2Fwww.cadfamily.com%2Fplus%2Fdownload.php%3Fopen%3D2%26id%3D6028%26uhash%3D90afc5> (Year: 2005).*

Roth, S et al. "Influence of mesh density on a finite element model under dynamic loading." 3rd European Hyperworks Technology Conference (2009) [retrieved on May 24, 2017]. Retrieved from <http://altairatc.com/europe/Presentations_2009/Session_14/UNI_BELFORT_EHTC_2009_ROTH_HS.pdf> (Year: 2009).*

Murray, Matt. "Total System Efficiency." Power Transmission Engineering (Feb. 2010), pp. 16-23 [retrieved on May 25, 2017]. Retrieved from <http://www.powertransmission.com/issues/0210/efficiency.pdf> (Year: 2010).*

"(Discrete) Probability Distributions." statistics.wikidot, Chapter 6 [retrieved on May 25, 2017]. Retrieved from <http://statistics.wikidot.com/ch6> (Year: 2017).*

Liston, Keith. "Hob Basic Part II." Gear Technology (Nov./Dec. 1993), pp. 18-23 [retrieved on May 25, 2017]. Retrieved from <http://www.geartechnology.com/issues/1193/liston.pdf> (Year: 1993).*

Wang, L et al. "Finite-Element Analysis of Unbalanced Magnetic Pull in a Large Hydro-Genertor Under Practical Operations." IEEE Transactions on Magnetics, vol. 44, No. 6 (Jun. 2008) [retrieved on May 25, 2017]. Retrieved from <http://ieeexplore.ieee.org/stamp/stamp.jsp?arnumber=4527022> (Year: 2008).*

"Abaqus 6.10 Analysis User's Manual." Dassault Systems (2010), Sections 1.1.1, 6.1.2, 6.3.5 and 26.3.7 [retrieved on May 24, 2017]. Retrieved from <http://abaqusdoc.ucalgary.ca/books/usb/default.htm> (Year: 2010).*

"Finite Elements for Nonlinear Problems." Computer Lab 2 [retrieved on May 25, 2017]. Retrieved from <http://www.it.uu.se/edu/course/homepage/finmet2/vt14/material/Lab2.pdf> (Year: 2017).*

Burtt, D. "Use of System Design Techniques in the Optimization of Integrated Powertrains Incorporating an IVT." Paper No. 2004-01-0352, doi 10.4271/2004-01-0352 (2004) [retrieved on May 23, 2017]. Retrieved from STIC Reference Request. (Year: 2004).*

Firth, A. "A Design Software Tool for Conceptual Design of Wind Turbine Gearboxes." EWEC 2010, vol. 4: Warsow, Poland [retrieved on May 22, 2017]. Retrieved from <http://eprints.whiterose.ac.uk/83335/7/2010%20Firth%2C%20Long_GearDesign%20%28EWEC2010%29.pdf> (Year: 2010).*

Crowther, Ashley "Application of Modern Engineering Design Tools for Reliability in Wind Turbine . . . " Romax Technology: SNL Wind Turbine Reliability Workshop (Aug. 3, 2011) [retrieved on May 22, 2017]. Retrieved from <http://energy.sandia.gov/wp-content//gallery/uploads/2-D-2-Crowther.pdf> (Year: 2011).*

* cited by examiner

DRIVELINE MODELLER

TECHNICAL FIELD

The present invention is related to the design of drivelines using computer-aided engineering (CAE), the drivelines comprising a system made up of sub-assemblies including internal combustion engines, gearboxes, generators, motors, flywheels, batteries, fuel tanks, super-capacitors, clutches, gears, pumps, shafts, blades for fans, helicopters, aircraft and wind turbines, vehicles and the like, and the sub-assemblies consisting of shafts, housings, pistons, blades, gears, bearings, clutches, rotors, stators and the like. The present invention is also related to the design of the assemblies that make up the driveline. The term "driveline" includes the terms "drivetrain" and "powertrain".

BACKGROUND ART

Designing a driveline is complex and time consuming. The engineer needs to know that the driveline is fit for purpose before it is made and to determine this various analytical methods are used to determine judge the performance or likelihood of failure, followed by optimisation to change the product definition so as to maximise the product performance. Analysis, either by mathematical simulation or other methods such as benchmarking (comparison with similar products), is typically carried out in a computer program and the domain of computer-aided engineering (CAE) has grown based on this intention.

The process of setting up the analysis for a given failure mode or aspect of performance requires creating a model of the system, sub-assemblies and components. Thus the process becomes one of (i) Modelling, (ii) Analysis, (iii) and Optimisation. A failure mode includes what constitutes a failure in terms of performance.

Different aspects of product performance need to be considered in the design process, including (but is not limited to): vehicle/product performance, energy/fuel efficiency/economy, exhaust gas emissions, packaging within the space constraints, cost, weight, structural deflections and stress, durability and fatigue, manufacturability, thermal performance, generation of audible noise, mechanical failure due to dynamic input loads, generation of dynamic loads adverse to the user and/or environment, speed and ratio changing, and satisfactory interaction with a control system.

To assess these different failure modes and aspects of performance, different mathematical analysis methods are used and these require different models of the system, consisting of different data. As a result, it is typical for CAE models for each failure mode to be built specifically for that failure mode. This is illustrated FIG. 1. Indeed, often CAE packages are developed specifically for the purpose of assessing a given failure mode.

To predict the performance of each component or sub-system often requires different computational algorithms. Also, the components are sub-systems are often designed and manufactured by different departments or companies. Thus, often the simulation of that component or sub-system focuses on the component or sub-system alone and ignores or simplifies the interactions that occur with other components or sub-systems. The result can be inaccurate predictions of product performance.

The design of the system evolves as a result of a process, as opposed to undergoing an instantaneous moment of creation. Some of the parameters defining the design are defined at the start of the process; others are not defined until the end.

As a result, the different analyses of product performance are carried out at different stages in the design process. Not all the methods are possible at the start. Typically, only relatively simple analyses are possible when the product definition is light, and it is only towards the end of the design process that more complex analyses are possible.

Moreover, for the same failure mode, a simple analysis may be carried out early in the design process and then the a more complex analysis may be carried out later on for the same failure mode, because the product definition is more mature and contains greater fidelity.

Therefore it can be seen that different models have different purposes and are used at different stages in the design process. No single model definition can be used for the complete design and optimisation of a driveline and the different models, each with their different features and different strengths and weaknesses, are used at different stages of the design process and by different engineering professionals.

This means that a team of designers will use a number of separate applications for analysing the performance of the driveline. To analyse the model at different levels of complexity, they will need to use separate applications for the same performance measure. In addition, a model suitable for mathematical analysis for one performance measure will not be suitable for another. Each member of the design team will need to exercise his or her own knowledge and experience to know (i) what application to select, (ii) what model and level of accuracy to use and (iii) what analysis is required to get the desired result.

In addition, there is a risk that the user will use a detailed analysis when the information describing the rotating machine assembly (input data) merits only a simple analysis; this may lead to errors in the analysis, yet the user may not know.

Furthermore, because the models are created manually, and in different applications, a change in the information describing the rotating machine assembly (product definition) does not, and often cannot, get cascaded to other analyses run in different applications.

This is particularly acute when considering a specific division in engineering activity that takes place during the creation of a product, that between design and analysis. Design, at least for the mechanical engineer, is often considered to concern the definition of the geometry of the product, whereas analysis studies the product in terms of how it functions for the aspects of performance or failure modes. In fact, the geometry that is considered in design is just another aspect of performance—it deals with the question of how the product fits the packaging space available. Yet this aspect of performance is typically dealt with by a completely different computer programme, CAD (Computer Aided Design), which has little or no calculation capability to predict other aspects of product performance, and poor or non-existent links to the analysis packages that do. CAD packages are typically operated by design engineers and analysis packages by analytical engineers. The result is a disconnect in the design process, poor productivity, sub-optimal products and wasted economic activity.

There is a further problem with complex analyses. The purpose of any analysis is to guide the design of the product, and so the value of the analysis comes when the result of the analysis is correctly interpreted/understood by the engineering team and the corresponding design decision is made. For a result to be understood, it needs to "make sense" to the engineers and correspond to the way that the engineers understand the system to perform. However, once an analysis becomes highly complex, it is possible that the result will be too complex to be understood or that it does not match the engineers' fundamental understanding of its performance. Thus, even though the analysis result may be the most accurate analysis possible, it will be discarded in the engineering decisions regarding the system.

It is an irony that the engineers' fundamental understanding of the system performance is very closely related to the simple analyses which may have been carried out at the start of the design process. Thus, the tension exists—there is a desire to increase complexity since this is assumed to increase accuracy and product performance, yet take this too far and complex analysis ceases to be of use.

The purpose of these analyses is to avoid failure modes. As the design matures through the design process, the increase in data definition represents an increase in monetary investment into the design, so any identification of failure mode needs to be achieved at the earliest possible opportunity, thereby minimising the financial cost of iterative rework.

This points to a final tension in the process. The process needs to provide speed of modelling and analysis to give the productivity, yet include all the system influences to provide the accuracy. Analysing a larger system with all of the system influences tends to lead towards a more complex analysis, yet as has been discussed this leads to problems with speed of modelling and analysis and in data interpretation.

The solution to this for many has been the development of application specific software packages, where the modelling and analysis functions are pre-defined for a given type of product or application. This allows the desired accuracy of modelling and analysis to be achieved without requiring every product being described from first principles, thereby maintaining productivity.

The current process that has been described for product design is one of creating models of the driveline so as to analyse various failure modes. Due to the natural hierarchy of the order in which design parameters are defined, and the different requirements for each analysis, the different analyses are carried out at different stages in the design process. Hence the design process consists of different representations of the same driveline being created at different stages for different analysis purposes.

One of the key performance criteria of a driveline can be referred to as Vehicle Performance, and this can be assessed very early in the design process, using a simple model that can be referred to as a "Block Diagram".

This consists of the major sub-assemblies: engine, gearbox, motor, battery, fuel tank and vehicle. Lines connect the sub-assemblies and denote the functional connection by which power is transmitted from one sub-assembly to another. This power can be in the form of either rotational mechanical power (between the engine, motor, gearbox and vehicle), electrical power (between the battery and motor) or chemical power (between the fuel tank and the engine). An example is given in FIG. 2.

The physical embodiment of the system means that rotational mechanical power is transmitted by a rotating shaft, electrical power by wires and chemical power by a fuel line. However, this detail is not required by the engineer, who simply wishes to view and understand the flow of power and energy within the driveline. Note that no geometric detail exists to describe the physical proportions of the systems or their proximity to one another.

Further properties can be assigned to the sub-assemblies. For example, a graph of torque and power against speed for the engine and motor, a set of gear ratios for the gearbox and mass, drag coefficient, rolling resistance, frontal area and tyre rolling radius for the vehicle. From this data, a simulation or analysis can be carried out to derive the vehicle performance (speed versus time, maximum speed etc.).

Still more functional properties can be assigned to the sub-assemblies. Efficiencies of the motor, gearbox and engine can be defined either as constant values or as graphs of efficiency against speed and torque (more complex relationships can also be defined, dependent on other parameters) and the vehicle can be "driven", in a virtual sense, around a certain drive cycle (speed versus time profile).

It is possible to derive values for the fuel economy and emissions of the vehicle for given drive cycles, driving styles etc. This is particularly common given the increasing requirement for low carbon vehicles, and this is another failure mode that needs to be assessed. This work is carried out in many different companies across the world and it is embodied in many different CAE packages. These CAE packages are typically Multi-domain dynamic simulation which can be divided into the two sub-categories of Generalist CAE packages (for example Simulink, Dymola, Modellica) and Application-specific vehicle simulation packages such as AVL Cruise and GT-Suite. In GB2470385A, a simulation model relies on components, also referred to as "virtual components", each of which is a model representing a component of the rotary machine within the system and comprising an algorithm. Each model reads in a stream of input data and transforms it into a stream of output data using its model algorithm. The properties of the models are exemplified as being lower and upper bounds of values, linear or non-linear relationships, initial value of differential equations and degree of complexity of analysis by the algorithm of the model.

As has been stated, a key aspect of product performance is packaging, i.e. the product must physically fit within the available space. For this, the system, sub-assemblies and components need their 3D geometry to be defined, and this is typically carried out in 3D CAD packages such as Wildfire, Solid Works, Catia, Unigraphics etc.

To such 3D CAD definitions can be added the density of the materials that are used, which allows the weight of the system, sub-assemblies and components to be calculated. This allows another aspect of product performance, weight, to be calculated.

It is a key aspect of the current software products that include the functions for assessing engineering performance (vehicle performance, efficiency, fuel economy) are in separate products from those that consider the 3D geometry, packaging and weight. Looking at the specific example of the gearbox, software products that assess vehicle performance, efficiency and fuel economy require the gearbox to be represented only in terms of its ratios, and perhaps the inertia and maybe torsional stiffness of the gearbox and its shafts. In effect, the gearbox occupies no 3D space and only has properties that relate to rotation about the axis or axes that transmit power.

Other aspects of engineering performance are considered in still further software packages. These aspects of engineering performance include structural deflections and stress, durability and fatigue, manufacturability, thermal performance, generation of audible noise, mechanical failure due to dynamic input loads, generation of dynamic loads adverse to the user and/or environment, speed and ratio changing, and satisfactory interaction with a control system. These are discussed in subsequent paragraphs.

Mechanical power transmission involves inducing stresses on components, which may cause catastrophic failure due to overload, fatigue failure or wear. It is typical to calculate the operating loads within a system, calculate the deflections and stresses of the components and hence the durability of the components and thus the whole system. Such simulations are typically embodied in generalist Finite Element packages such as Nastran, Ansys or Abaqus or application specific packages such as RomaxDesigner, KissSoft (for gearboxes) and AVL Excite (for engines).

Other application specific packages are developed for other sub-systems such as motor and generators, which are the subject of packages such as Opera, SPEED and JMAG.

Within the gearbox, gears are key components, which are required to be durable, quiet and efficient, and at the same time fit within the available space and also be manufacturable. It is typical to calculate the stress (for durability), efficiency and generated vibration for the gear, but sometimes this is done without regard for the manufacturability of the gear. A key aspect is how the shape of the cutting tool for the gear, and in particular the protuberance of the hob, shaper or milling cutter affects the shape of the gear and thus the results for the durability, noise and efficiency. Failure to account for these aspects of manufacturability can result in inaccurate results.

With regard to dynamic analysis, the complexity of the mathematical representation varies greatly depending on the failure mode being studied. Examples are given below:

A "Drive cycle simulation" is a dynamic analysis where, for example, a road going vehicle is simulated being driven along a certain route consisting of varying speeds. This has been described previously, with regard to "block diagram" modelling. For this simulation, the failure mode/performance criteria are fuel economy and CO2 emissions.

An "Acoustic simulation" is where the structure of a driveline is excited by some periodically repeating forcing such as engine firing (from an internal combustion engine), torque ripple (from a motor) or transmission error (from a gear mesh). The driveline structure (including rotating components such as shafts and gears and structural components such as housings, casings etc.) vibrates in response to this excitation. This forced response is calculated and the results of interest are the vibration at the driveline mount positions (this gets transmitted to the structure of the vehicle, for example) or the vibration at the surfaces of an external housing (this can be converted to a radiated acoustic signal). Such simulations are typically embodied in generalist FE packages such as Nastran, Ansys and Abaqus or generalist multi-body packages such as ADAMS or Simpack. For this simulation, the failure mode/performance criteria is noise, vibration and harshness.

Various "Driveline transient simulations" are carried out which look at the phenomenon where a power transmitting driveline consisting of rotating components is subject to rapid changes in driving torque or speed.

In one instance, the response of the driveline may include the reversing of the sign of the torque, leading to components with backlash such as gears and splines travelling across the backlash region and experiencing impact loads. Such simulations are typically embodied in generalist multi-body packages such as ADAMS or Simpack. For this simulation, the failure mode/performance criteria is a high shock load within the system or an impact that can be heard or felt by the operator.

In another instance, the change in torque may come from the vehicle driving over a bump or the electric motor experiencing a grid fault or electrical short. The response of the driveline may include the high loads on key components (leading to durability problems) or the acceleration/deceleration of the vehicle (unpleasant for the occupants). Such simulations are typically embodied in generalist multi-body packages such as ADAMS or Simpack. For this simulation, the failure mode/performance criteria is a high shock load within the system or a change in acceleration felt by the operator.

Three examples of different dynamic simulations for drivelines have been described. Others can be described, including gear rattle, tip-in/tip-out, imbalance, gear shift quality and engagement of two-speed generators in wind turbines.

Some of these dynamic phenomena are related to the sub-system and some are related to the full driveline system. As such, they are of interest to, and are influenced by, component suppliers (e.g. bearing and synchroniser suppliers), sub-system suppliers (e.g. gearbox, engine, motor, driveshaft suppliers) and vehicle manufacturers.

In many cases, the behaviour of the sub-system is influenced by the detailed characteristics of the components, and the behaviour of the driveline is influenced by the detailed characteristics of the sub-system. Thus detailed design information needs to be passed from component supplier to sub-system supplier and sub-system supplier to vehicle manufacturer. However, this process is impeded since the component and sub-system suppliers are often unwilling to divulge the detailed design information of their products due to reasons of confidentiality.

It is possible for dynamic models of sub-systems to be packaged up into a sub-model. These are sometimes referred to as "S-functions" (in the case of multi-domain simulation packages such as Simulink) or super-elements (in the case of finite element and multi-body dynamics packages).

In any case, since the details of such models are hidden, it is essential that they have the correct level of detail for the simulation of a given dynamic phenomenon or failure mode. The recipient of the model depends on the model formulation being correct for the accuracy of the simulation results that will be obtained, yet often dynamic models are set up in a sub-optimal manner.

As the design of the product and the sub-systems proceeds, further analyses are carried out. It is common for the electric motor or generator to be designed by motor/generator specialists or companies and likewise for gearboxes. The temptation is to assume that the two sub-systems assemble together without problems and the other sub-system is a benign receiver or deliverer of rotating power. Thus the sub-systems are designed and analysed in separate mathematical models, with the assumption that a smooth, invariant passage of torque is delivered though a perfectly aligned shaft.

In fact, when power is transmitted through a gearbox, separating forces at the gears cause the shafts to bend, the bearings to deflect and the housing to deflect. When power is generated in the motor, the rotor is subject to unbalanced magnetic pull and any shaft deflections or run out will lead to the rotor being pulled off centre. These forces (plus moments) and deflections (plus misalignments) are important in calculating the loads on the bearings and hence bearing life, and gear stress, life, noise and efficiency. Also, the air gap in the motor, which affects the motor efficiency, is also affected.

It is possible to calculate the effect of loads and deflections within a gearbox and their effect on gearbox performance within a gearbox simulation. Likewise, it is possible to calculate the unbalanced magnetic pull in a motor using a motor simulation. However, interactions between the two sub-systems are not considered.

This is becoming increasingly important as the design of compact electro-mechanical drivelines requires that motors and gearboxes are becoming more and more integrated, so such interactions are becoming more important.

Understanding the dynamic behaviour of any product often involves creating a mathematical model from which the natural frequencies and mode shapes can be derived. This is the most effective starting point when the product behaves in a linear or predominantly linear manner.

It is possible to calculate the natural frequencies and mode shapes of a gearbox using generalist tools such as Finite Element Analysis (e.g. Ansys, Nastran) or Multi-Body Dynamics (e.g. ADAMS) or specialist tools such as RomaxDesigner or MASTA. Similarly, it is possible to calculate the natural frequencies and mode shapes of the structural (mechanical) parts of the motor using the same tools. However, the natural frequencies and mode shapes of the complete assembly require that the interactions between the two sub-systems are considered.

Again, this is becoming increasingly important as the design of compact electro-mechanical drivelines requires that motors and gearboxes are becoming more and more integrated, so such interactions are becoming more important.

Further, the definition of the natural frequencies and mode shapes of a system requires that all the relevant masses and stiffnesses of the system are correctly included. Often, the stiffnesses within a mechanical system relate solely to the contact and tensile stiffnesses of the mechanical components. However, in the case of a motor, the unbalanced magnetic pull on the rotor arising from the electromagnetic forces also constitutes a stiffness, in fact a negative stiffness. This affects the natural frequencies and mode shapes of the system but is not currently considered.

When power is generated by a motor and transmitted by a gearbox, dynamic excitations are generated in the form of torque ripple and varying electromagnetic forces in the motor and gear transmission error and run out in the gearbox. These excitations propagate through the driveline, resulting in noise radiation.

It is possible to calculate the dynamic response and acoustic radiation of a gearbox using generalist tools such as Finite Element Analysis (e.g. Ansys, Nastran) or Multi-Body Dynamics (e.g. ADAMS) or specialist tools such as RomaxDesigner or MASTA, combined with acoustic simulation tools such as Coustyx. Similarly, it is possible to calculate the dynamic response and acoustic radiation of the structural (mechanical) parts of the motor using the same tools.

However, the dynamic response and acoustic radiation of the complete assembly require that the interactions between the two sub-systems are considered. The torque ripple, transmission error and electromagnetic forces excite the whole gearbox/motor structure. This does not occur if the sub-systems are simulated in separate mathematical models.

Also, the air gap in the motor, which affects the motor efficiency, is also affected by the dynamic response of the system to unbalanced magnetic pull, out of balance mass, deflections of the rotor shafts and component manufacturing tolerances, but this is not calculated and instead values for the air gaps are either estimated or carried over from previous designs.

The previous paragraphs talk about the requirements for an accurate and complex mathematical model of the gearbox and/or motor system for the purposes of assessing the dynamic response and acoustic radiation. The source of acoustic radiation is the gearbox/motor housing, so to calculate the acoustic radiation the housing needs to modelled in substantial detail so that it can be included in the simulation of the system.

However, this presents a problem when applying the methods to the practical design of products since, at the concept design stage, the engineer is interested in major changes to the layout such as changing bearing and gear positions, shaft centre distances, even number of shafts. Therefore, no housing design exists. Technical investigations have shown that the calculated dynamic response of a motor, gearbox or electro-mechanical driveline system is very different depending on whether a concept model is used (with the outer races of the roller bearings held rigid) or a detailed model is used (with the outer races of the roller bearings attached to the mass/stiffness representation of the housing).

Therefore, the design engineer is unable to determine by simulation which concept design is likely to be best or worst performing when it comes to dynamic response to torque ripple and transmission error. Currently, the engineer needs to select a concept without such knowledge and invest time and money in designing a housing before any such simulation can be carried out.

DISCLOSURE OF INVENTION

According to a first aspect of the invention, there is provided a method of computer aided engineering for producing a design for a driveline. The method comprising the steps of: providing a parametric description of the driveline design; receiving a user selection of one or more failure modes for analysis; selecting data from the parametric description appropriate to a complexity of analysis; analysing the selected data; and providing the user with performance information. This means that the user can evaluate how well the design meets a performance target. An advantage is that the parametric description comprises data relating to form, function, properties and operating conditions of the driveline or its components. A further advantage is that the parametric description is a single common source of data for all analyses. In a further step, performance is optimised by amending the parametric description and repeating the analysing step.

Preferably, the analysing step involves deriving one or more mathematical models from the parametric description. This means that data used to derive the mathematical models for analysing multiple different failure modes are derived from the single common data source.

Preferably, the driveline comprises one or more subsystems and in which the subsystem comprises one or more components, and in which the step of analysing comprises a dynamic analysis, and in which the step of deriving a mathematical model of the component or the subsystem comprises forming a discretised model. This can involve determining a frequency range from a dynamic analysis of the component or the subsystem and in which the step of analysing further comprises analysing the mathematical model of the component or the subsystem in the frequency range whereby the step of analysing is fast and accurate.

This can include further steps of: receiving a user selection of the dynamic analysis, the failure mode or aspect of product performance; and selecting automatically suitable settings for the frequency range, appropriate linear and non-linear features, and/or one degree-of-freedom and six degree-of-freedom behaviour. This means that the data selected from the parametric description are relevant to the analysis being performed.

Preferably, the user selection of one or more failure modes comprises an efficiency of a driveline for a drive cycle or population of drive cycles, and the step of analysing comprises the steps of: converting a speed versus time history into a residency histogram of duration versus speed versus acceleration; and multiplying the residency histogram with an efficiency map to give the efficiency. A software package can calculate the efficiency, fuel economy or emissions of a driveline using either time domain simulation or a residency histogram of duration versus speed versus acceleration (or torque versus rotational speed), with the selection being made by the user.

Preferably, the user selection of one or more failure modes comprises stress, durability, noise and/or efficiency of a gear, and the step of analysing comprises the step of: analysing for an effect of a shape of a cutting tool for the gear, including an effect of a protuberance of a hob, a shaper or a milling cutter.

Preferably, the driveline comprises an electric motor/generator and a gearbox, and in the user selection of one or more failure modes comprises component life, and the step of analysing comprises the step of: analysing system deflections of an electric motor or generator by including unbalanced magnetic pull within the electric motor or generator and gear separation forces. The failure mode includes manufacturing and assembly tolerances. Preferably, the model is a dynamic model of an electro-mechanical driveline and is excited by more than one of the sources: (i) transmission error from gears; (ii) torque ripple from a motor/generator; and (iii) radial electro-mechanical loads from a motor/generator.

Preferably, the user selection of one or more failure modes comprises mode shape and natural frequency for a driveline system that includes a gearbox and/or a motor or generator, linearising non-linear behaviour of a gear mesh stiffness, a roller bearing stiffness and/or unbalanced magnetic pull at a given speed and load operating point.

Preferably, the user selection of one or more failure modes comprises an air gap of an electric motor or generator and the step of comprises the step of: analysing system deflections in quasi-static or dynamic conditions.

Preferably, the user selection of one or more failure modes comprises a dynamic behaviour of a motor, gearbox, driveline or an electro-mechanical driveline at a concept stage, and the step of analysing comprises the step of: applying a generic housing stiffness to outer raceways of all bearings to give the a vibratory power being passed from the bearing outer rings to a housing in response to torque ripple and/or transmission error.

Preferably, the user selection of one or more failure modes further comprises packaging of the driveline, and includes the step of the user assessing a geometrical dimensioning of the driveline or component thereof in a graphical user interface.

Preferably, the step of analysing the parametric description for performance is carried out by a computer readable product. A step of assessing a geometrical dimensioning and packaging of a gearbox and/or a motor/generator can be carried out by the same computer readable product. Analysing for failure modes can be carried out by the same computer readable product. The performance can be engineering performance. The engineering performance includes one or more of the following: vehicle/product performance, energy/fuel efficiency/economy, exhaust gas emissions, cost, structural deflections and stress, durability and fatigue, manufacturability, thermal performance, generation of audible noise, mechanical failure due to dynamic input loads, generation of dynamic loads adverse to the user and/or environment, speed and ratio changing, and satisfactory interaction with a control system.

Preferably, the step of providing or the step of updating the parametric description involves: creating within a graphical user interface of a computer system a layout of the driveline according to the steps of: receiving a user selection of components for the driveline; positioning the selected components; and creating associations between the selected components. A single parametric description based on one or more of the associations, relative positions of the selected components, properties of the selected components and properties of the associations is formed.

Preferably, the user can transition from a graphical user interface for a driveline to a graphical user interface for a gearbox, in which the latter allows the definition, modification and analysis of gearbox ratios, functional layout, geometry dimensions, component loads, deflections, and durability. This means that changes made in the graphical user interface for the gearbox can amend the parametric description and analyses carried out in the graphical user interface for the driveline.

According to further aspects, the present invention provides a computer readable product for computer aided engineering design of a driveline, the product comprising code means for implementing the steps of the methods described above.

According to further aspects, the present invention provides a computer system for computer-aided engineering design of a rotating machine assembly, the system comprising means designed for implementing the st steps of the methods described above.

BRIEF DESCRIPTION OF DRAWINGS

The present invention will now be described, by way of example only, with reference to the accompanying drawings, in which.

BEST MODE FOR CARRYING OUT THE INVENTION

Figure 1:
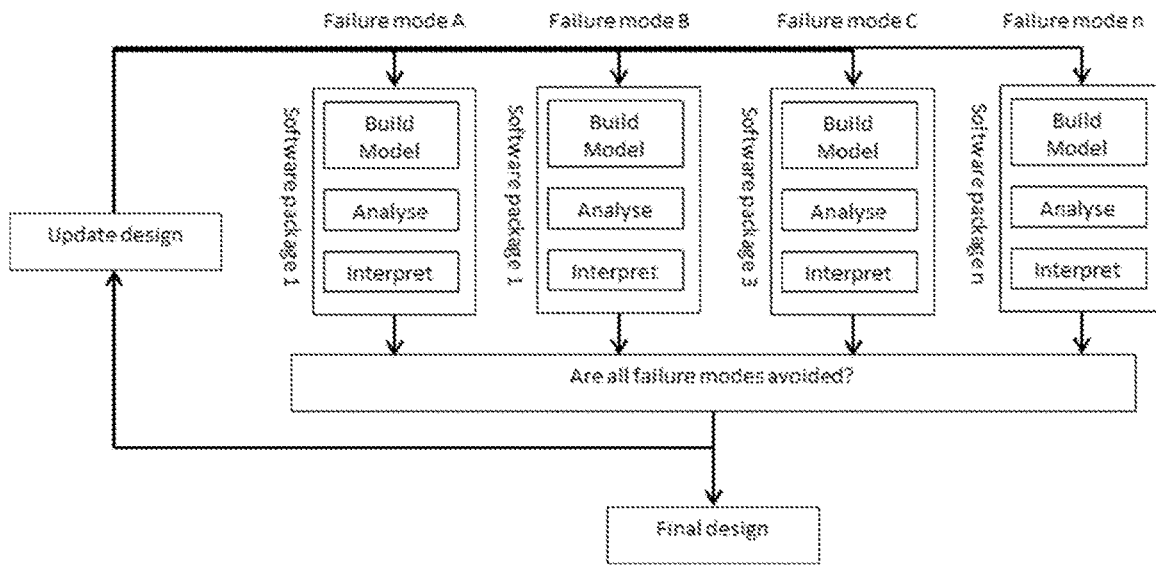
FIG. 1 shows prior art approaches for assessing different failure modes and aspects of performance, using different models of the system, consisting of different data.
Figure 2:
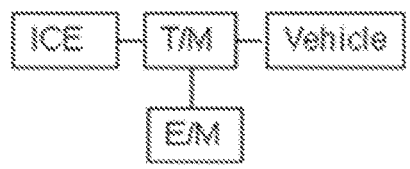
FIG. 2 shows a block diagram representation of a driveline.

There is a need for an integrated approach that solves these problems and allows a model of the driveline, assembly or component to be made, followed by an analysis to judge the performance, followed by optimisation to change the product definition so as to maximise the product performance, and which can be used by all the different engineering professionals who are involved in the design, providing excellent usability and productivity for the engineers, and in which the three aspects of modelling, analysing and optimising are integrated.

In the context of the present invention, it is to be understood that the term "driveline" refers to the whole system, from the point at which energy is converted from another form (linear kinetic, chemical, electrical, hydraulic etc.) into rotational kinetic and elastic energy to the point at which the rotational kinetic and elastic energy is converted another form (electrical, hydraulic, linear kinetic etc.) The former point can be referred to as the "prime mover", and the latter point can be referred to as the "consumer". It will be clear, therefore, that the term "driveline" includes the terms "drive train", "power train", "transmission", "power transmission system", and any other term relating to the "whole system" referred to above. The term "assembly" includes the terms "sub-assembly", "subsystem", "arrangement" and any other term relating to an arrangement of components of the kind referred to above. Components of the drivetrain include turbines, headstock, spindle, splines and propeller.

Engineers are tasked with designing these systems, sub-assemblies and components in such a way that they meet various performance targets and avoid various failure modes. The terms "performance target" and "failure mode" will be understood to be opposite aspects of how an assembly or a driveline behaves: if it exhibits one or more failure modes then it has not met a corresponding performance target. Other terms used include "aspect of performance", "aspect of product performance" and "performance criteria". The context of this invention is that it looks to address many of these issues: (i) the different analyses carried out have the same data source (ii) once data is input for one purpose, it is reused for other purposes (iii) due to the common source of product data, changes to data definition is cascaded for the purposes of updating all analyses (iv) a given analysis should be carried out using the most appropriate level of detail in terms of product data required and complexity of analysis (v) both the product data and complexity of analysis are adjustable levels. This means that even when a complex analysis has been carried out, the complexity of the analysis can be reversed step-by-step by eliminating complexity and reverting to the simple analyses, which most closely match the engineer's fundamental understanding of how the product functions (vi) interactions between components and sub-systems that take place across the whole of the product are taken into account wherever they are appropriate (vii) analysis for a failure mode should be carried out at the earliest opportunity; multiple failure modes are assessed by within the same software environment (viii) in particular, the question of whether the product fits within the available space is an aspect of product performance that is considered alongside all the other aspects of product performance (ix) the software functions are developed into an application specific interface which provides the user with the optimum combination of productivity of modelling and analysis with suitably complex product definition.

A key feature of the invention is that there is a single Parametric Description of the system, from which multiple models for multiple failure mode analyses are derived.

The term Parametric Description is the label applied to the collection of data that defines the product in terms of its form, function, properties and operating conditions. Form includes data relating to geometry; Properties include the material properties of the components, plus component specific properties such as the dynamic capacity of a bearing, the surface roughness of a gear tooth flank, the viscosity of a lubricant, the Goodman diagram of a shaft material, the resistivity of electric motor windings etc.; Operating conditions includes principally the power, speed, torque of the rotating machinery, either as a time history or a residency histogram, but also includes temperature, humidity etc.; Function defines the way in which the product, sub-systems and components perform their primary function, for example, the function of a roller bearing is to provide support to a shaft whilst allowing it to rotate, assemble a shaft and a bearing together and the combined function is to provide a rotating shaft to which loads can be applied, mount a gear on the shaft, mesh it with a similarly mounted gear and the combined function is to change speed and torque (i.e. a gearbox).

TABLE 1

Analysis-Specific Data Selection and the Parametric Description

| | 800 Parametric Description | | | |
|---|---|---|---|---|
| Analytical Package | 802 FUNCTION | 804 FORM | 806 PROPERTIES | 808 OPERATING CONDITIONS |
| 810 Multi-body Dynamics & Finite Element Packages | | Yes | Yes | Yes |
| 812 Multi-domain Dynamic Simulation; Application-specific vehicle performance packages | Yes | | Yes | Yes |
| 814 CAD | | Yes | Yes | |

Figure 8:
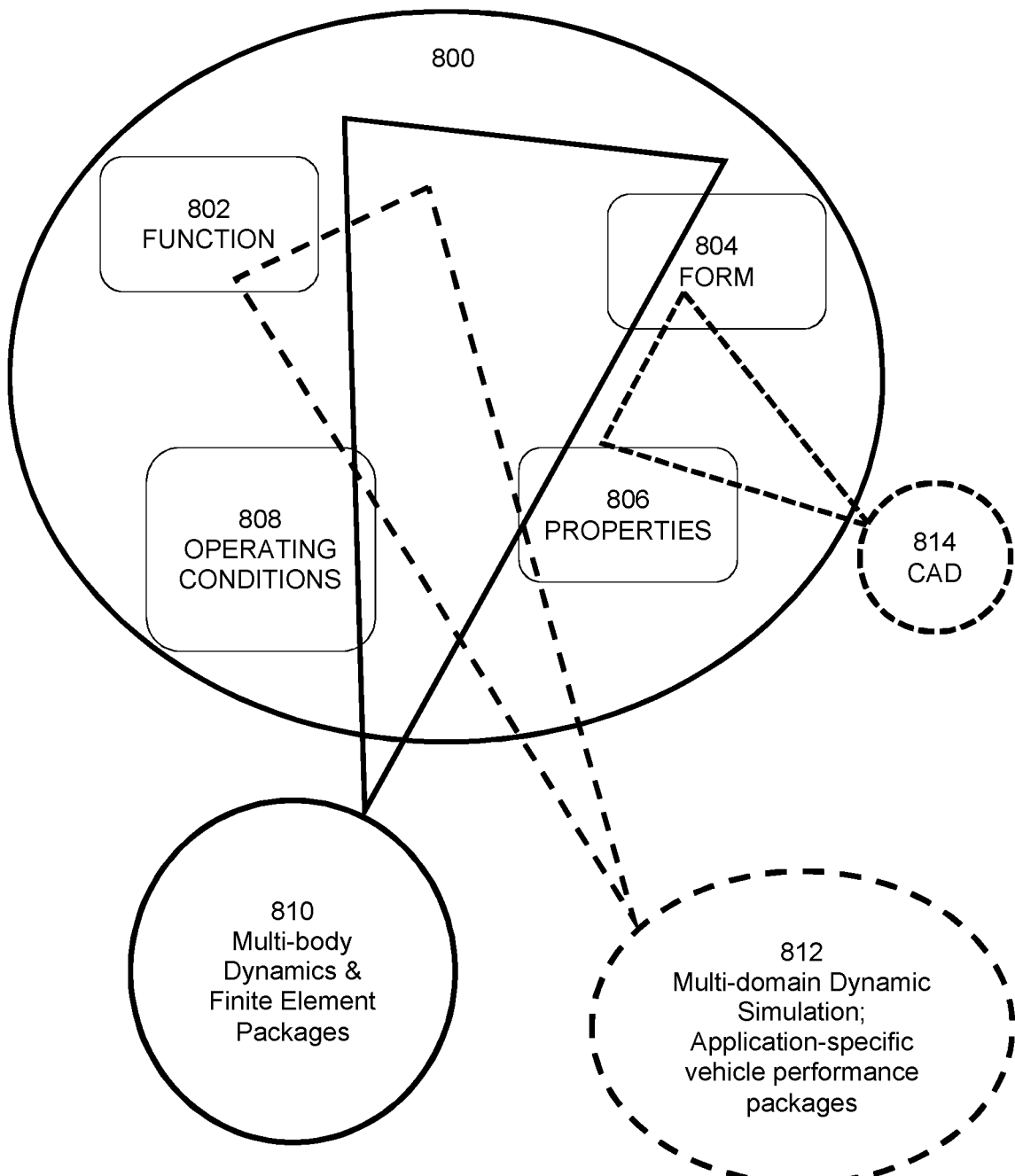
FIG. 8 shows a representation of a parametric description formed of four non-overlapping data sets.

The first row of Table 1 shows a representation of parametric description 800, formed of four data sets (Function 802, Form 804, Properties 806, and Operating Conditions 808). FIG. 8 shows a further representation of parametric description 800, formed of four non-overlapping data sets (Function 802, Form 804, Properties 806, and Operating Conditions 808). Depending on which analytical package 810,812,814 is used, the engineer has to select data from one or more of the four data sets to create an analytical model suitable for the analysis being performed. Referring to FIG. 1, current practice has typically been to build separate analytical models for each failure mode.

In traditional software packages, CAD provides form (geometry) and some aspects of properties (material density but not Young's Modulus), but it does not include operating conditions or function. Models in Multi-Body Dynamics and Finite Element packages include certain aspects of form, function, properties and operating conditions, but only those that are pertinent to the specific failure mode that is being simulated (see FIG. 1). Models in Multi-domain dynamic simulation also use the aspects of function, properties and operating conditions that are pertinent to the specific failure mode that is being simulated (see FIG. 1), but no form. Models in application specific vehicle simulation packages (e.g. AVL Cruise) are similar to those in Multi-domain dynamic simulation packages, in that they have aspects of function, properties and operating conditions that are pertinent to the specific failure mode that is being simulated (see FIG. 1), but no form.

This is illustrated in FIG. 8, where the relevant data set for analysis 810 is represented by the triangular set overlapping part Form set 804, Properties set 806 and Operating Conditions set 806 and which, in this example, provides data for multi-body dynamics or finite element packages. Similarly, the relevant data set for analysis 812 is represented by the triangular set overlapping part of Function set 802, Properties set 806 and Operating Conditions set 808 and which, in this example, provides data for multi-domain dynamic simulation or application-specific vehicle performance packages. Likewise, the relevant data for analysis 814 is represented by the triangular set overlapping part of Form set 804 and Properties set 806 and which provides data for CAD.

In traditional software packages, the absence of all four types of data leads to discontinuities in the work flow within the design process. FIG. 8 illustrates how it is this discontinuity that this invention eliminates.

Figure 3:
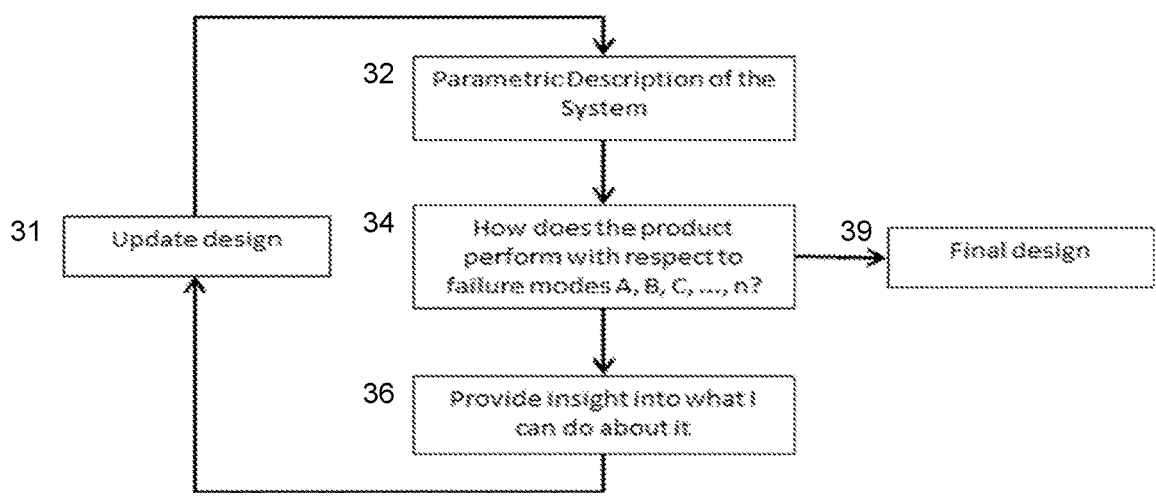
FIGS. 3 and 9 show how a common source of data can be used for all analyses, facilitating the cascading of data across all analyses and models once a change is made.

This is further illustrated in FIG. 3, which contrasts with the approach used in FIG. 1. In a first step 32, a parametric description of the system is provided. This parametric description can be formed as described below, or it can be a parametric description which has been developed previously. In a step 34, a user or users define failure modes for the product being designed, and the design is analysed to determine how it performs with respect to the chosen failure modes. As disclosed above, the analysis is a mathematical analysis on the single data set comprising the parametric description. The analysis means that in a third step 36 the user has insight into how the design is failing to meet the performance criteria. In a fourth step 38, the user can modify and update the design, and hence the parametric description, and repeat the process. Finally, in a fifth step 39, the final design is derived.

This means that there is a common source of data for all analyses, facilitating the cascading of data across all analyses and models once a change is made.

Modelling is as simple as is possible for the purposes required and analysis of failure modes is carried out as early as possible. Thus the simplest definition of the driveline starts with that described below, with purely the primary function of the driveline (the transmission of power for driving the vehicle) described by the driveline configuration.

Figure 4:
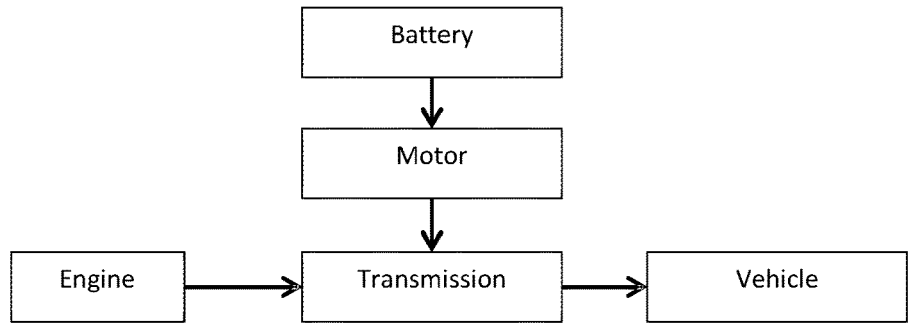
FIG. 4 shows a parallel hybrid configuration.

FIG. 4 shows a parallel hybrid configuration. If the electric motor and battery are removed then a conventional internal combustion engine driven vehicle is described. If the engine is removed then an electric vehicle is described. The connections for the powerflow are simple yet unambiguously describe the driveline's function.

Figure 5:
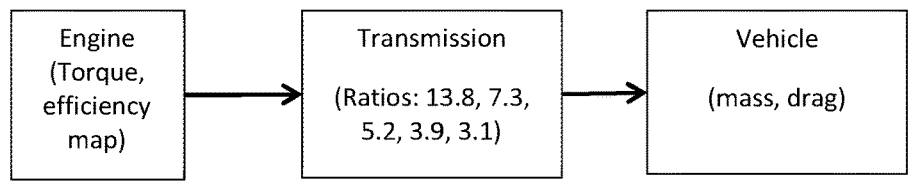
FIG. 5 shows data added to the definition of the sub-assemblies of FIG. 4.

From here, data can be added to the definition of the sub-assemblies, as shown in FIG. 5. The addition of a few parameters allows first vehicle performance calculations to be performed, and then fuel economy calculations. Efficiency includes fuel economy or emission.

For the calculation of fuel economy and emissions, it is common to use as an input a given "drive cycle", such as JC08, NEDC and FTP. These set a pre-defined speed versus time history that the vehicle "drives" (in a virtual sense), for which the total fuel consumption or emissions is calculated.

As has been stated, common implementations of the drive cycle analysis use Multi-domain dynamic simulation packages, be they Generalist CAE packages (for example Simulink, Dymola, Modellica) or Application-specific vehicle performance packages such as AVL Cruise and GT-Suite. In all these instances the calculation proceed by "time-step integration", whereby the velocity ($V(t)$) at a given time instance ($t$) is used to calculate the propulsion and drag forces on the vehicle at a given time, the difference giving rise to acceleration, which is integrated across a short time period to give a new velocity ($V(t+1)$) at a time instance ($t+1$), and so on. There are differences between forward and backwards integration, but the methods are essentially the same.

The problem occurs in that it is common practice to use a predefined drive cycle (e.g. NEDC) and use this repeatedly for the design and optimisation of the driveline. The driveline becomes highly optimised for the driving style that is represented by the selected drive cycle, however when real-life driving is applied, the fuel economy deviates substantially from the targets.

It is possible for a company to acquire data on different driving styles, from real-life sources, and include these as inputs to the analysis and optimisation of drivelines. However, the nature of the time domain analysis means that analysing 1000 drive cycles takes more or less 1000 times as long as analysing 1 drive cycle. Thus, this provides an impediment to being used during practical design projects.

An alternative to this is to carry out a simplified analysis of the efficiency of the driveline, which is slightly simpler (and less accurate) than the time step integration, but runs much more quickly and allows the inclusion of large numbers of drive cycles without time penalty.

The speed versus time history is simplified into a residency histogram of duration or number of cycles versus speed (speed of vehicle or system input/output) versus acceleration or torque (positive and negative). This is fixed for the drive cycle and is independent of the vehicle. For each point on the speed versus acceleration surface, the driveline efficiency is calculated from the combined efficiency maps of the engine, gearbox, motor etc. This efficiency map is independent of the drive cycle.

The calculation of the efficiency of the driveline for the drive cycle is simply a matter of multiplying the residency histogram with the efficiency map.

Advantages are as follows: the calculation is much quicker than time domain simulation. More importantly, if a change to the driveline (gear ratio, gear shift strategy, vehicle mass etc.) is made then all that is needed is a recalculation of the driveline efficiency map, since the drive cycle is unchanged. Most importantly, all the drive cycles under consideration can be "stacked" together into a residency histogram that represents a wider range of driving styles but which does not have any penalty in terms of analysis time. In other words, once the drive cycle data is prepared, analysing 1000 drive cycles takes more or less the same time as analysing 1 drive cycle.

Thus there is the potential for companies to categorise drive cycles by territory, location, driver characteristics (aggressive/passive, city/urban, class of vehicle etc.), even statistical assessments (1%, 10%, mean, 90%, 99%) and carry out "what-if" analyses to investigate the sensitivity of the product design with respect to different market segments.

Within the software package additional data is added to the definitions of the engine, motor, battery and gearbox. The vehicle performance and drive cycle figures provide information on the torque/power to be delivered by the engine and motor and transmitted by the gearbox. From this, calculation methods to derive the size and hence packaging requirements and weight of the sub-systems can be derived. Thus, assessment of multiple aspects of driveline performance (packaging, weight, vehicle performance, efficiency, fuel economy) can be assessed within the same software package.

In particular, for the gearbox, the transition to a more detailed representation has specific features. Initial representations of the gearbox define it as a series of gear ratios (see a previous diagram). This allows drive cycle simulations to be carried out, hence vehicle fuel economy and emissions can be calculated. However, the physical embodiment of the gearbox requires that the shaft, bearing, clutch and gear arrangement be defined and suitable ratios are assigned to the gears to achieve the previously-identified ratios.

Designers often use conceptual models, such as a "stick diagram" in preliminary stages of gearbox design, and these provide an easy way to view functional relationships between components. Such diagrams help designers of gearboxes to conceptualise their designs without reverting to in-depth structural analysis or detailed engineering drawings. Initially they can define these functional relationships without having to define information about sizing and packaging of components.

Once the basic function of the concept or concepts for a given gearbox has been fixed, the arrangement is subject to more calculations, whereby the torque that is applied to each gear set and the ratio of that gear set are used to estimate the required packaging of the gear set by predicting the pitch circle diameters of the gears, the face widths and the centre distance. This is the simplest form of durability analysis for gears, and can be carried out with the simplest set of inputs. It also defines the principal parameters that define the packaging of the gearbox and also the gearbox weight.

A specific feature of the invention is that it permits the transition from one representation of a gearbox (ratios only) in a graphical user interface for driveline modelling to another representation (a stick diagram, consisting of the functional connections of shafts, bearings, gears and clutches) in a graphical user interface for gearbox modelling within the same software package. In practice, this is carried out by a user defined command in the driveline modelling graphical user interface, such as a double-click or the like, performed on an icon that represents the gearbox.

Figure 6:
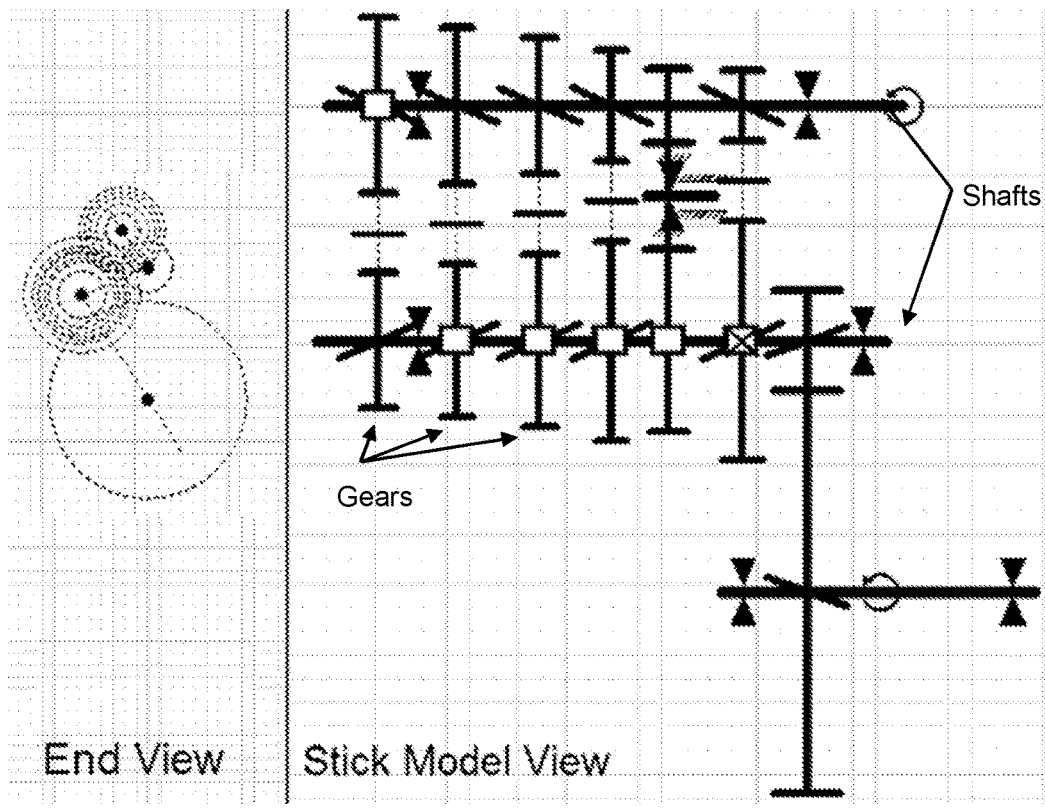
FIGS. 6 and 7 show a graphical user interface displayed to the user and which allows the user to interact with the method of the invention.

In FIG. 6, a user has created a stick diagram of a gear box having a number of gears mounted on parallel shafts. The bearings are defined as simple supports and the gears by ratios alone. The housing is not defined and is assumed to be rigid. The shaft sections have not been defined and so the shaft stiffness is assumed. The powerflow analysis can be performed and the torque capacity and recommended centre distance for the gears, plus the bearing and housing loads can be calculated.

Figure 7:
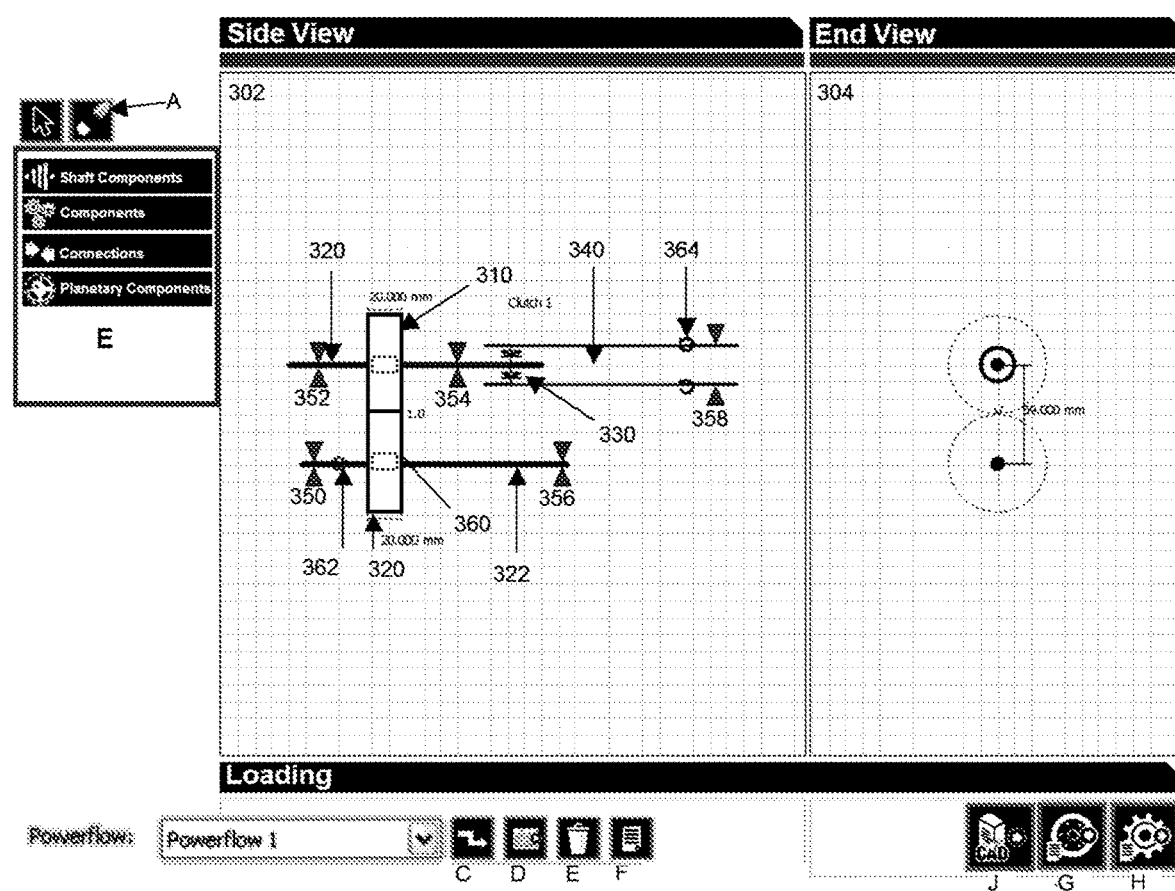

FIG. 7 shows an example of a graphical user interface displayed to the user and which allows the user to interact with the process of the invention to create a schematic of the kind shown in FIG. 6. In FIG. 7 the schematic of the rotating machine is a functioning model of the rotating machine itself.

The work area comprises one or more views 302,304. Two such views are shown in FIG. 6 corresponding to a side view 302 and an end view 304 of the rotating machine being designed. The side view may be either a true representation of the view of the rotating machine as viewed along a given axis, or it may be a folded out representation of the rotating machine through one or more cut planes. The rotating machine in FIG. 7 is shown using a "stick diagram" form as is commonly used, in which the gears are represented by rectangular elements. However other diagrammatic representations of the rotating machine components can be used, including "stick diagrams" in which the gears are represented by a generally "I"-shaped element.

In the example shown in FIG. 7, two gears 310, 312 are respectively mounted on two shafts 320,322. Shaft 320 is connected via clutch 330 to concentric shaft 340. In this example, shafts are shown as being arranged in a general horizontal direction, but it is to be understood that shafts may be aligned in any direction, such as vertical, diagonal and the like, and that machines with perpendicular shafts can be defined and analysed. Shafts 320,322,340 are supported on bearings 350,352,354,356,358. Initially, the bearings are very simple shaft supports, with no user-defined information on the radial, axial or tilt stiffness. As the model matures, additional stiffness data can either be defined by the user or calculated.

An example of a power flow 360 between an input 362 and an output 364 is shown.

Once the engineer is working on the stick diagram in the gearbox modelling interface, it is possible to change centre distances, change ratios, face widths etc. within the software interface and this changes the parameters of the gearbox.

This is not only a graphical representation of a transmission, but also a working model of the function of the rotating machine assembly, on which calculations can be carried out to predict the function and performance of a rotating machine assembly.

The "stick diagram" is a very efficient and logical way of representing a transmission that consists of external gear sets. The shaft is drawn along its centre line. However, where planetary gear sets are involved, or systems with many concentric shafts are involved, it is necessary to represent the shafts in terms of the outer diameter of the shaft rather than the centre line, or in terms of outer diameter and inner diameter. A further refinement is that the user can automatically switch between views.

Figure 9:
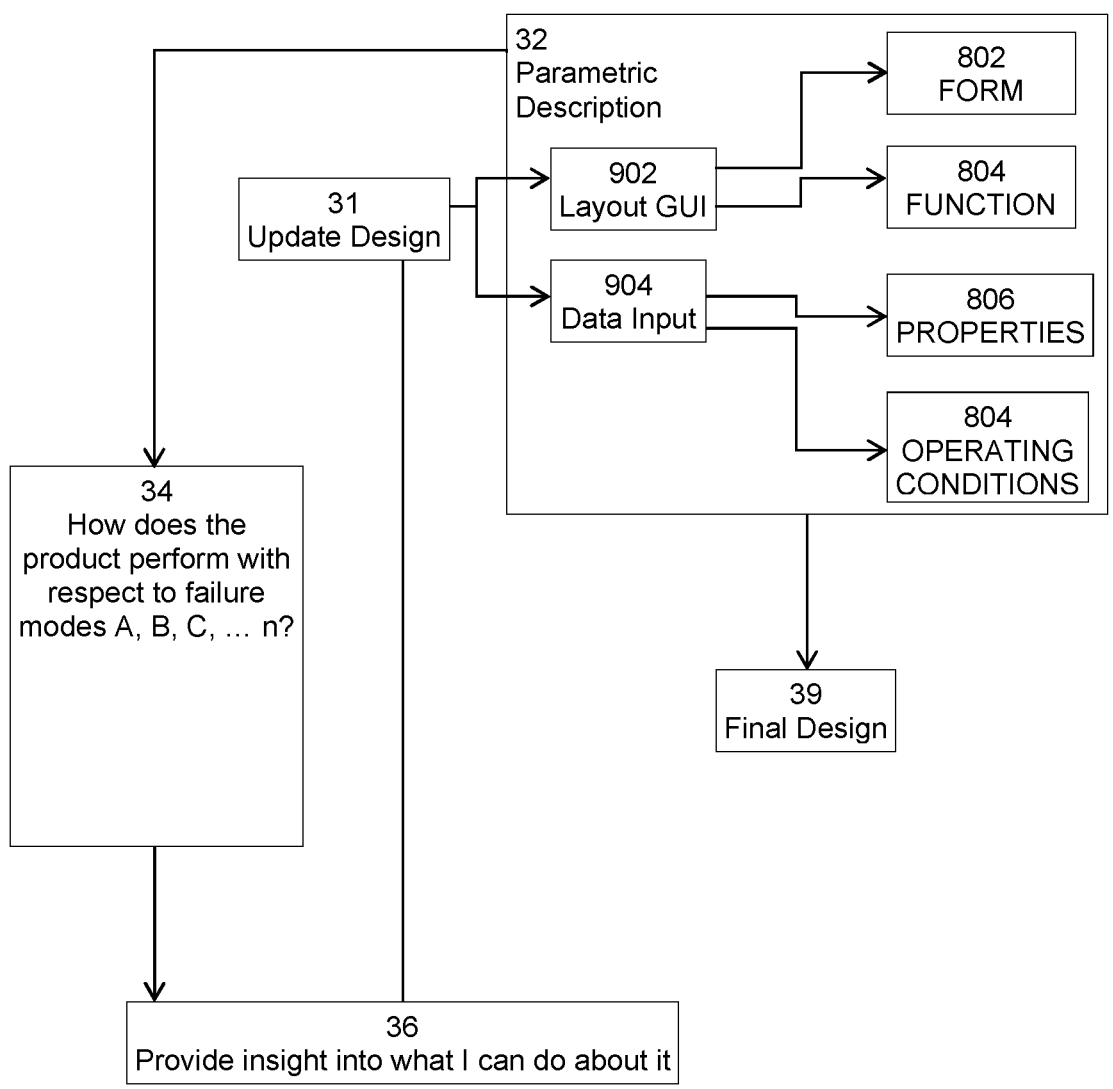

The interaction between the user interface and the parametric description can be better understood by referring to FIG. 9, which shows how a common source of data can be used for all analyses, facilitating the cascading of data across all analyses and models once a change is made via the user interface or the modelling. In a first step 32, the parametric description can be set up by a user interacting with layout GUI 902, and typically this creates Form 802 and Function 804 data held within the parametric description. The user can also add Property 806 and Operating Condition 808 data via data input 904. Thus the design developed by the user becomes a single data source for subsequent operations. In step 34, the user can evaluate how the design meets the performance criteria required in the product. In this step, the models and analyses use relevant data held in the parametric description to provide the user in step 36 with the performance information required. This allows the user to update the design in step 31, and the process is repeated until the design meets the product requirements in step 39.

Changing the gear ratios within the gearbox modeler thus changes the behaviour of the driveline of which the gearbox is part. It is a feature of the invention that these changes in the gearbox modeler interface are cascaded up to the analysis at the driveline system level.

Another example of this is when changes are made to the gearbox sub-system, the dynamic behaviour of the gearbox changes, and this is automatically cascaded up to the driveline model. These changes can be as simple as changing the centre distance of the gears (thus changing the inertia of the gearbox) or as detailed as changing the pre-load of the bearings (thus changing the linearised bearing stiffness and thus the mode shapes and natural frequencies of the gearbox sub-assembly at a given load condition).

Once it has been established that the overall driveline and sub-assemblies match the requirements of the vehicle for packaging, weight, performance, efficiency etc., according to the initial assessment, further details can be added to the system and more detailed analyses can be made.

Efficiency and fuel economy can be recalculated using the method of "time step integration". This is more accurate than the method of torque/speed residency, and can be used to look at aspects such as State of Charge within a battery, kinetic energy saturation within a flywheel and thermal effects. However, it is more time consuming and there is a time penalty for assessing multiple drive cycles.

This is a method that is used by the industry standard tools of AVL Cruise etc. The unique features are that the software package has both the time domain and the simpler torque/speed residency method in the same package, that the user can switch between them so as to gain the advantages of each, and that alongside the efficiency and fuel economy methods there is insight into other aspects of performance such as packaging and weight.

Further details can be added to the system definition, to the extent that various dynamic analyses can be carried out to assess the driveline performance for aspects such as acoustic noise (in response to, for example, engine firing, gear whine, torque ripple, electromagnetic forces within the motor etc.), gear rattle, shunt, tip-in/tip-out, clonk, shock loads, gear shift quality, powertrain bending, driveline torsional models etc.

These different phenomena and failure modes have different physical characteristics. Acoustic-based phenomena start at 20-50 Hz frequency and run up to 15000 Hz or so. Vibrations that can be felt or that lead to component failure are 20-50 Hz and lower. High frequency vibrations have a shorter wavelength and thus require a higher fidelity model with more nodes and a larger total number of degrees of freedom, which needs greater computational effort.

Similarly, some of the phenomena are fundamentally linear in their behaviour and others are highly non-linear. Finally, some of the phenomena can be described by a mathematical model that is torsional only, that is to say, the model has one degree-of-freedom only at a given node. For others, all 6 degrees-of-freedom are required.

Thus, a suitable mathematical model of the components, sub-systems and overall system needs to be created for the given analysis. The system is represented by a collection of nodes, a process that is known as discretisation, which is a process of transferring continuous models and equations into discrete counterparts. The nodes possess certain properties (degrees-of-freedom) that are related to the purpose of the analysis. For example, if torsional vibration is being studied then the nodes must possess a torsional degree of freedom. If translational motion is being studied then they must possess translational degrees of freedom. The nodes also possess inertia related to the relevant degrees of freedom, and are connected to neighbouring nodes by stiffness and damping terms to complete the dynamic model.

The nodes are the points in the model for which results will be derived, so it is important for the nodes to be placed at the locations that are of interest. Furthermore, nodes need to be placed in sufficient quantities for the behaviour of the system to be adequately described. For example, a vibratory waveform needs at least 4 nodes along its wavelength to describe its shape. Hence a vibration with a wavelength of 1 centimetre cannot be described if the nodes are separated by more than 0.25 centimetres. Given that the velocity of vibration in a continuous solid is more-or-less constant and is related to the Young's Modulus and Density, higher frequency vibration has proportionally shorter wavelength and requires corresponding finer discretisation.

In the conventional approach, it is common for a mathematical model to be created for each failure mode since the failure mode is assessed in a different package. The model may be created automatically by the software package or defined by the user.

However, there is no check as to whether the model is suitable for the analysis being carried out. It may be that the model is unreasonably detailed, with a consequential penalty in analysis time, or it is insufficiently detailed, meaning that the results may be inaccurate. It is possible that the model may include details in one area that are excessive whilst missing necessary fidelity in other areas, leading to both slow computation and inaccuracy.

It is well known that engineers spend time rebuilding and refining dynamic models in Finite Element and Multi-Body Dynamics packages, refining the models and checking to see how the analysis results vary as the level of discretisation varies. They aim to seek reassurance that the model is suitably accurate without being excessively detailed, but the process is slow and time consuming and normally ends up being carried out by the most highly qualified and hence expensive engineer within the organisation, with resulting adverse impacts on cost.

The invention provides the function whereby a mathematical model of the components, sub-system and/or system is created specifically so as to provide the optimum accuracy and computational efficiency for the given failure mode or aspect of product performance. The software package considers the dynamic behaviour of the system that is required to be assessed and the frequency range that is required. It then uses analytical formulation to create a mathematical model that is optimised for speed and accuracy of analysis, so that the mathematical model is accurate for any analyses up to and including the limiting frequency range, and has suitable features (nodal positions, connections to components, boundary conditions etc.) and degrees of non-linearity so as to analyse the phenomenon or failure mode of interest. Discretization of the model is carried out automatically so as to retain nodes at the points in the model that are imperative for describing the physical phenomenon (failure mode) being studied.

Another feature can be that the user interface allows the engineer to select the phenomenon or failure mode to be assessed and the software package automatically creates appropriate settings for the frequency range, aspects of non-linearity and degrees-of-freedom to be included. This way, an accurate, yet computationally efficient mathematical model of the system can be created by engineers with no specialist expertise in the given field of analysis.

Ensuring that the mathematical model is set up in an optimised way for a given dynamic phenomenon or failure mode has another advantage. It enables component and sub-system models to be packages into sub-models (also known as S-functions or superelements), allowing the details of the design to be hidden for the purposes of protecting intellectual property, yet enabling the simulation to use all the pertinent design data and thus be as accurate as possible.

The invention seeks to consider influences that extend across the product in a way that is not possible using current tools, by calculating the interactions between the sub-systems. Electro-mechanical drivelines are becoming increasingly common, with highly integrated electric motors and gearboxes. When power is generated in the motor, the rotor is subject to unbalanced magnetic pull and any shaft deflections or run out will lead to the rotor being pulled off centre. These forces (plus moments) and deflections (plus misalignments) are important in calculating the loads on the bearings and hence bearing life, and gear stress, life, noise and efficiency. Also, the air gap in the motor, which affects the motor efficiency, is also affected.

The invention allows the gearbox and motor to be defined as a single system, from which these failure modes can be investigated. A suitable mathematical model can be derived for calculating all the forces and deflections. The gear separating forces, bearing and housing stiffness and rotor unbalanced magnetic pull are all combined into a single system calculation that leads to the calculation of bearing loads and misalignments, gear misalignments, shaft deflections, housing deflections and reduction in air gap.

The one or more failure modes include natural frequencies and mode shapes (eigenvectors and eigenfrequencies), which are calculated for the complete gearbox and motor system rather than separate sub-assemblies, and this includes the unbalanced magnetic pull on the rotor, which is linearised and represented as a negative stiffness for the given speed and torque condition of the motor. Other non-linear aspects are also linearised—the gear mesh stiffness and the stiffness of the roller bearings are calculated for the given load conditions and are assumed to be linear. All of these are included in a single system calculation.

From this, the dynamic response and acoustic radiation is calculated for the complete gearbox and motor system, accounting for gear transmission error, motor torque ripple and electromagnetic forces, and calculating the response of the eigenvector and eigenfrequency formulation as described in the previous paragraph.

The invention is also able to use the dynamic simulation of the gearbox and motor system, along with unbalanced magnetic pull, out of balance mass, deflections of the rotor shafts and component manufacturing tolerances, to calculate the reduction in the air gap in the motor in operating conditions. This can be used to define the most appropriate air gap for the motor, thus optimising the motor efficiency.

The invention also looks to the concept selection stage of a motor, gearbox or electro-mechanical driveline and provides insight into which concept is likely to be most or least responsive to excitation from torque ripple or transmission error at a stage where there is no housing design.

Technical investigations have shown that the calculated dynamic response of a motor, gearbox or electro-mechanical driveline system is very different depending on whether a concept model is used (with the outer races of the roller bearings held rigid) or a detailed model is used (with the outer races of the roller bearings attached to the mass/stiffness representation of the housing).

The invention provides a function by which an additional housing flexibility is applied to the outer races of each of the roller bearings, giving an approximate representation of the flexibility of a full housing design. The coefficients of this flexibility are typically derived from inspecting the leading diagonal terms of the stiffness matrices of finite element representations of completed housing designs from other, similar products.

The dynamic simulation is then run, with the system responding to the excitation from the torque ripple and/or transmission error. Technical investigations have shown that the calculated dynamic response of this modified model is much closer to that of a completed, detailed model than for a conventional concept model, where the outer races of the roller bearing are held rigid.

However, this simulation does not give a value of acoustic radiation, since there is no housing structure to radiate the noise. Therefore the invention uses an innovative analysis whereby the dynamic loads on the bearings are then used to calculate the vibratory power being transmitted through the bearing outer races to give an indication of which system has the greatest/least dynamic response to excitation from the torque ripple and/or transmission error.

This can be carried out for each bearing individually, or the power can be summed across all bearings. The power can be assessed at individual speeds and loads or summed across all operating points. The power can be calculated in response to a calculated (predicted) value or torque ripple or transmission error, or in response to a nominal, unit value of torque ripple or transmission error.

INDUSTRIAL APPLICABILITY

The invention also provides the possibility to analyse gears for their stress, durability, noise and efficiency. At the same time they must fit within the available space and also be manufacturable. In calculating the stress (for durability), efficiency and generated vibration for the gear, this also considers the manufacturability of the gear. Specifically, the shape of the cutting tool for the gear, and in particular the protuberance of the hob, shaper or milling cutter are included in the package and this allows the engineer to assess these influences alongside packaging, weight, efficiency, durability and noise in a single environment.

The invention allows for the assessment of many aspects of the engineering performance of a mechanical of electro-mechanical driveline. These include: vehicle/product performance, energy/fuel efficiency/economy, exhaust gas emissions, cost, structural deflections and stress, durability and fatigue, manufacturability, thermal performance, generation of audible noise, mechanical failure due to dynamic input loads, generation of dynamic loads adverse to the user and/or environment, speed and ratio changing, and satisfactory interaction with a control system.

A fundamental innovation is that all of these aspects of simulation are carried out at the same time and in the same package as the assessment of the 3D geometry of the components and subsystems, which can be used for checking packaging of the components, subsystems and driveline and the weight calculation.

The invention claimed is:

1. A method of computer aided engineering for producing a design for a driveline of a vehicle, the method comprising the steps of:
   a) providing a parametric description of the driveline design as a single common source of data for a plurality of failure mode analyses of one or more components of the driveline in which the parametric description comprises data sets relating to form, function, properties and operating conditions of the driveline or components thereof, wherein the driveline comprises an electric motor/generator and a gearbox that are defined as a single system, and wherein the driveline transmits power to enable the vehicle to be driven;
   b) receiving a user selection of a failure mode of a component of the driveline, the failure mode providing an indication that the driveline has not met a performance target of the vehicle;
   c) selecting data from the data sets of the parametric description appropriate to a complexity of analysis of the selected failure mode indicating that the driveline has not met the performance target of the vehicle;
   d) analysing the selected data to obtain performance information of the driveline;
   e) providing the user with the performance information;

f) repeating steps b) to e) for at least one further user-selected failure mode to obtain the performance information of the driveline from the plurality of failure mode component analyses wherein selecting data for the at least one further user-selected failure mode analyses comprises selecting data from different data sets than those data sets from which data is selected for the selected failure mode;

g) receiving a modification of the design from the user;

h) updating the parametric description and repeating steps c) to e); and i) repeating steps g) and h) until the design meets the performance target, wherein the step d) comprises deriving one or more mathematical models from the parametric description, whereby data used to derive a mathematical model of the one or more mathematical models for the plurality of failure mode analyses is derived from the single common source of data, wherein the mathematical model is a dynamic model of an electro-mechanical driveline and is excited by more than one of the following sources:

(i) transmission error from gears;
(ii) torque ripple from the electric motor/generator;
(iii) radial electro-mechanical loads from the electric motor/generator.

2. The method according to claim 1, in which the driveline comprises one or more subsystems and in which the subsystem comprises the one or more components, and in which the step of analysing comprises a dynamic analysis, and in which the step of deriving the mathematical model for one of the plurality of failure mode analyses comprises forming a discretised model of a component or subsystem.

3. The method according to claim 2, in which the discretised model comprises nodes, and in which degrees-of-freedom per node have linear or non-linear characteristics suitable for the failure mode.

4. The method according to claim 2, further comprising the step of:

selecting automatically suitable settings within a frequency range and/or behaviour that can be described in terms of one degree-of-freedom per node and six degree-of-freedom per node;

in which the step of selecting automatically comprises selecting settings relevant to the dynamic analysis.

5. The method according to claim 1, in which the user selection of the failure mode comprises component life, and in which the step of analysing comprises the step of:

analysing unbalanced magnetic pull or rotor shaft deflections within the electric motor/generator and gear separation forces within the gearbox.

6. The method according to claim 5, in which the failure mode includes manufacturing and assembly tolerances.

7. A non-transitory computer readable storage medium encoded with instructions that, when executed by a processor, cause the processor to perform a method of computer aided engineering for producing a design for a driveline of a vehicle, comprising the steps of:

a) providing a parametric description of the driveline design as a single common source of data for a plurality of failure mode analyses of one or more components of the driveline in which the parametric description comprises data sets relating to form, function, properties and operating conditions of the driveline or components thereof, wherein the driveline comprises an electric motor/generator and a gearbox that are defined as a single system, and wherein the driveline transmits power to enable the vehicle to be driven;

b) receiving a user selection of a failure mode of a component of the driveline, the failure mode providing an indication that the driveline has not met a performance target of the vehicle;

c) selecting data from the data sets of the parametric description appropriate to a complexity of analysis of the selected failure mode indicating that the driveline has not met the performance target of the vehicle;

d) analysing the selected data to obtain performance information of the driveline;

e) providing the user with the performance information; and f) repeating steps b) to e) for at least one further user-selected failure mode to obtain the performance information of the driveline from the plurality of failure mode component analyses, wherein selecting data for the at least one further user-selected failure mode analyses comprises selecting data from different data sets than those data sets from which data is selected for the selected failure mode, wherein the step of analysing includes using a mathematical model which is a dynamic model of an electro-mechanical driveline and is excited by more than one of following the sources:

(i) transmission error from gears;
(ii) torque ripple from the electric motor/generator;
(iii) radial electro-mechanical loads from the electric motor/generator.

8. The non-transitory computer readable storage medium as in claim 7, wherein the user selection of the failure mode comprises mode shape and natural frequency, and in which the step of analysing comprises the step of:

linearising non-linear behaviour of a gear mesh stiffness, a roller bearing stiffness and/or unbalanced magnetic pull at a given speed and load operating point.

9. The non-transitory computer readable storage medium as in claim 7, wherein the user selection of the failure mode comprises an efficiency of a driveline for a drive cycle or population of drive cycles.

10. The non-transitory computer readable storage medium as in claim 7, wherein the user selection of the failure mode comprises an air gap of the electric motor/generator and in which the step of analysing comprises the step of analysing system deflections in quasi-static or dynamic conditions.

11. The non-transitory computer readable storage medium as in claim 7, wherein the failure mode is engineering performance including one or more of the following: vehicle/product performance, energy/fuel efficiency/economy, exhaust gas emissions, cost, structural deflections and stress, durability and fatigue, manufacturability, thermal performance, generation of audible noise, mechanical failure due to dynamic input loads, generation of dynamic loads adverse to the user and/or environment, speed and ratio changing, or interaction with a control system.

12. A method of computer aided engineering for producing a design for a driveline of a vehicle, the method comprising the steps of:

a) providing a parametric description of the driveline design as a single common source of data for a plurality of failure mode analyses of one or more components of the driveline in which the parametric description comprises data sets relating to form, function, properties and operating conditions of the driveline or components thereof, wherein the driveline comprises an electric motor/generator and a gearbox that are defined as a single system, and wherein the driveline transmits power to enable the vehicle to be driven;

b) receiving a user selection of a failure mode of a component of the driveline, the failure mode providing an indication that the driveline has not met a performance target of the vehicle;

c) selecting data from the data sets of the parametric description appropriate to a complexity of analysis of the selected failure mode indicating that the driveline has not met the performance target of the vehicle;

d) analysing the selected data to obtain performance information of the driveline;

e) providing the user with the performance information; and f) repeating steps b) to e) for at least one further user-selected failure mode to obtain the performance information of the driveline from the plurality of failure mode component analyses wherein selecting data for the at least one further user-selected failure mode analyses comprises selecting data from different data sets than those data sets from which data is selected for the selected failure mode, wherein the step of analysing includes using a mathematical model which is a dynamic model of an electro-mechanical driveline and is excited by more than one of the following sources:

(i) transmission error from gears;
(ii) torque ripple from the electric motor/generator;
(iii) radial electro-mechanical loads from the electric motor/generator.

13. The method according to claim 12, in which the user selection of the failure mode comprises an efficiency of a driveline for a drive cycle or population of drive cycles.

14. The method according to claim 13, comprising an additional step of receiving a user selection of analysis, in which the selection of analysis is calculating efficiency by time domain simulation, and repeating steps a) to e), wherein the user can compare analyses.

15. The method according to claim 12, in which the user selection of the failure mode comprises stress, durability, noise and/or efficiency of a gear, and in which the step of analysing comprises the step of:

analysing for an effect of a shape of a cutting tool for the gear, including an effect of a protuberance of a hob, a shaper or a milling cutter.

16. The method according to claim 12, in which the user selection of the failure mode comprises an air gap of the electric motor/generator and in which the step of analysing comprises the step of:

analysing system deflections in quasi-static or dynamic conditions.

17. The method according to claim 12, in which the user selection of the failure mode comprises a dynamic behaviour of the electric motor/generator, the gearbox, the driveline or an electro-mechanical driveline at a concept stage, and in which the step of analysing comprises the step of:

applying a generic housing stiffness to outer raceways of all bearings to give a vibratory power being passed from bearing outer rings to a housing in response to torque ripple and/or transmission error.

18. The method according to claim 12, in which the user selection of the failure mode comprises packaging of the driveline.

19. The method according to claim 12, in which the failure mode is engineering performance.

20. The method according to claim 19, in which engineering performance includes one or more of the following: vehicle/product performance, energy/fuel efficiency/economy, exhaust gas emissions, cost, structural deflections and stress, durability and fatigue, manufacturability, thermal performance, generation of audible noise, mechanical failure due to dynamic input loads, generation of dynamic loads adverse to the user and/or environment, speed and ratio changing, or interaction with a control system.

* * * * *